(12) United States Patent
Sender Beleta et al.

(10) Patent No.: US 10,343,417 B2
(45) Date of Patent: Jul. 9, 2019

(54) DIAGNOSTIC PLOT FOR PRINTING SYSTEM

(71) Applicant: Hewlett-Packard Development Company, L.P., Houston, TX (US)

(72) Inventors: Jordi Sender Beleta, Barcelona (ES); M.Isabel Borrell Bayona, Barcelona (ES); Marcos Casaldaliga Albisu, Sant Cugat del Valles (ES); Marti Rius Rossell, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/570,249

(22) PCT Filed: Jul. 15, 2015

(86) PCT No.: PCT/US2015/040571
§ 371 (c)(1),
(2) Date: Oct. 27, 2017

(87) PCT Pub. No.: WO2017/011005
PCT Pub. Date: Jan. 19, 2017

(65) Prior Publication Data
US 2018/0134046 A1    May 17, 2018

(51) Int. Cl.
*B41J 2/21* (2006.01)
*B41J 29/393* (2006.01)
(Continued)

(52) U.S. Cl.
CPC .............. *B41J 2/2135* (2013.01); *B41J 2/21* (2013.01); *B41J 2/2146* (2013.01); *B41J 29/393* (2013.01);
(Continued)

(58) Field of Classification Search
CPC ........ B41J 2/2135; B41J 2/175; B41J 2/2146; B41J 29/393; B41J 2029/3935; B41J 11/001; H04N 1/6041; H04N 1/506
See application file for complete search history.

(56) References Cited

U.S. PATENT DOCUMENTS

| 6,076,915 A | 6/2000 | Gast et al. |
| 6,871,931 B2 | 3/2005 | Kaneko |

(Continued)

FOREIGN PATENT DOCUMENTS

| CN | 1576030 | 2/2005 |
| CN | 101261459 | 9/2008 |

(Continued)

OTHER PUBLICATIONS

Cole, "A Novel Approach to Print Head Alignment for Wide Format Printers", NIP & Digital Fab Conf, 2005 Intl Conf on Digital Printing Tech, Abstract, 2 pgs.

(Continued)

*Primary Examiner* — Sharon A. Polk
(74) *Attorney, Agent, or Firm* — Dicke Billig & Czaja PLLC

(57) ABSTRACT

A method of generating a diagnostic plot for a printing system includes printing a first half of a diagnostic pattern representative of a first state of the printing system, and printing a second half of the diagnostic pattern representative of a second state of the printing system. Variation of the diagnostic pattern from an adjacent diagnostic pattern indicates the printing system is out of specification.

14 Claims, 8 Drawing Sheets

(51) Int. Cl.
   *H04N 1/60*   (2006.01)
   *H04N 1/50*   (2006.01)
   *B41J 11/00*  (2006.01)
   *B41J 2/205*  (2006.01)

(52) U.S. Cl.
   CPC .......... *H04N 1/6041* (2013.01); *B41J 11/001* (2013.01); *B41J 2002/2058* (2013.01); *B41J 2029/3935* (2013.01); *H04N 1/506* (2013.01)

(56) References Cited

U.S. PATENT DOCUMENTS

| | | |
|---|---|---|
| 8,662,625 B2 | 3/2014 | Donaldson |
| 8,879,085 B2 | 11/2014 | Vandemark et al. |
| 2002/0041299 A1 | 4/2002 | Lee et al. |
| 2004/0160468 A1 | 8/2004 | Kim et al. |
| 2005/0062784 A1 | 3/2005 | Matsuzaki et al. |
| 2006/0066655 A1 | 3/2006 | Richard et al. |
| 2006/0132530 A1 | 6/2006 | Yasuda |
| 2006/0269342 A1 | 11/2006 | Yoshida et al. |
| 2008/0043261 A1 | 2/2008 | Klement et al. |
| 2011/0242186 A1 | 10/2011 | Mizes et al. |
| 2012/0216694 A1* | 8/2012 | Galiazzo ............. H01L 31/1876 101/483 |
| 2013/0257969 A1 | 10/2013 | Chandu et al. |
| 2014/0098151 A1 | 4/2014 | Uchida |

FOREIGN PATENT DOCUMENTS

| | | |
|---|---|---|
| CN | 103917376 | 7/2014 |
| EP | 1176802 | 1/2002 |
| JP | 2005007723 | 1/2005 |
| JP | 2009214514 | 9/2009 |
| JP | 2015030166 | 2/2015 |

OTHER PUBLICATIONS

Vantram, "Fully Automated Calibration Procedure to Compensate Print Non-Uniformities Incurred in Fixed Print-Head Array Structures", Ricoh Tech Rprt No. 39, Jan. 2014, 154-160.

\* cited by examiner

DIAGNOSTIC PLOT FOR PRINTING SYSTEM

BACKGROUND

A wide-array printing system may include multiple printheads or print elements for printing on a print medium. Variations between the print elements may degrade image quality.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

Figure 1:
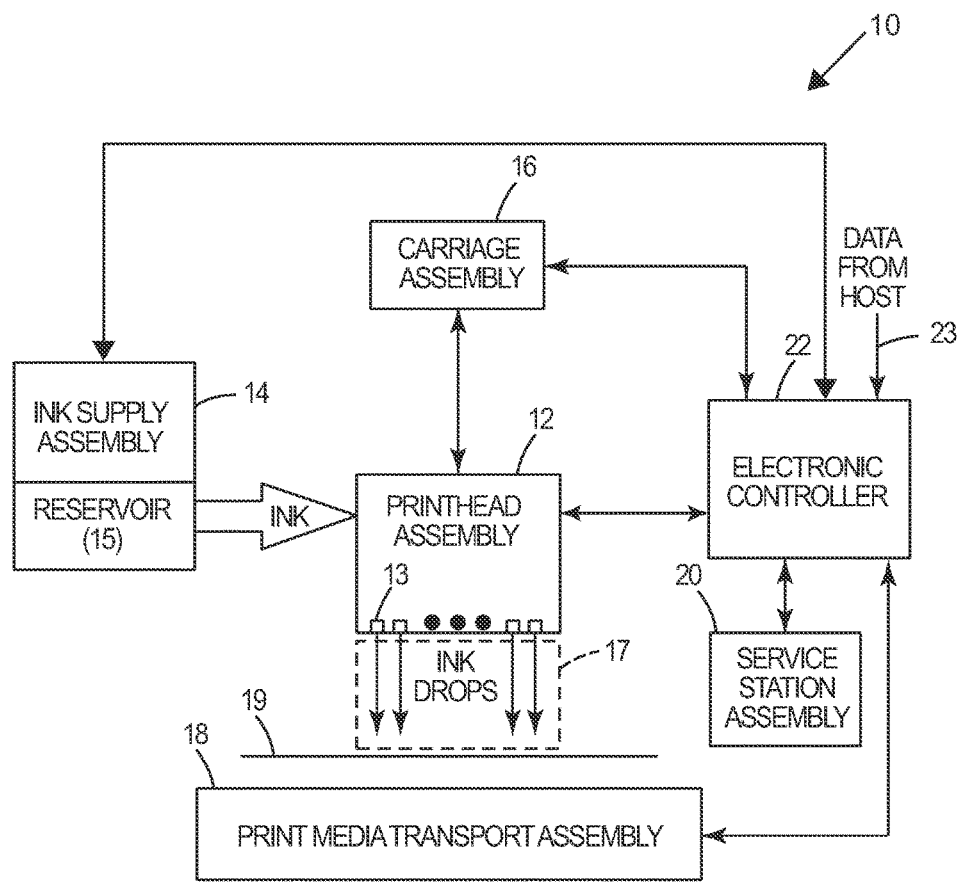
FIG. 1 is a block diagram illustrating one example of a printing system.

FIG. 1 illustrates one example of an inkjet printing system 10. Inkjet printing system 10 includes a fluid ejection assembly, such as printhead assembly 12, and a fluid supply assembly, such as ink supply assembly 14. In the illustrated example, inkjet printing system 10 also includes a carriage assembly 16, a print media transport assembly 18, a service station assembly 20, and an electronic controller 22.

Printhead assembly 12 includes at least one printhead or fluid ejection device which ejects drops of ink or fluid through a plurality of orifices or nozzles 13. In one example, the drops are directed toward a medium, such as print medium 19, so as to print onto print medium 19. Print medium 19 includes any type of suitable sheet material, such as paper, card stock, transparencies, Mylar, fabric, and the like. In one example, nozzles 13 are arranged in at least one column such that properly sequenced ejection of ink from nozzles 13 causes characters, symbols, and/or other graphics or images to be printed upon print medium 19 as printhead assembly 12 and print medium 19 are moved relative to each other.

Ink supply assembly 14 supplies ink to printhead assembly 12 and includes a reservoir 15 for storing ink. As such, in one example, ink flows from reservoir 15 to printhead assembly 12. In one example, printhead assembly 12 and ink supply assembly 14 are housed together in an inkjet or fluid-jet print cartridge. In another example, ink supply assembly 14 is separate from printhead assembly 12 and supplies ink to printhead assembly 12 through an interface connection, such as a supply tube.

Carriage assembly 16 positions printhead assembly 12 relative to print media transport assembly 18 and print media transport assembly 18 positions print medium 19 relative to printhead assembly 12. Thus, a print zone 17 is defined adjacent to nozzles 13 in an area between printhead assembly 12 and print medium 19. In one example, printhead assembly 12 is a scanning type printhead assembly such that carriage assembly 16 moves printhead assembly 12 relative to print media transport assembly 18. In another example, printhead assembly 12 is a non-scanning type printhead assembly such that carriage assembly 16 fixes printhead assembly 12 at a prescribed position relative to print media transport assembly 18.

Service station assembly 20 provides for spitting, wiping, capping, and/or priming of printhead assembly 12 in order to maintain a functionality of printhead assembly 12 and, more specifically, nozzles 13. For example, service station assembly 20 may include a rubber blade or wiper which is periodically passed over printhead assembly 12 to wipe and clean nozzles 13 of excess ink. In addition, service station assembly 20 may include a cap which covers printhead assembly 12 to protect nozzles 13 from drying out during periods of non-use. In addition, service station assembly 20 may include a spittoon into which printhead assembly 12 ejects ink to insure that reservoir 15 maintains an appropriate level of pressure and fluidity, and insure that nozzles 13 do not clog or weep. Functions of service station assembly 20 may include relative motion between service station assembly 20 and printhead assembly 12.

Electronic controller 22 communicates with printhead assembly 12, carriage assembly 16, print media transport assembly 18, and service station assembly 20. Thus, in one example, when printhead assembly 12 is mounted in carriage assembly 16, electronic controller 22 and printhead assembly 12 communicate via carriage assembly 16. Electronic controller 22 also communicates with ink supply assembly 14 such that, in one implementation, a new (or used) ink supply may be detected, and a level of ink in the ink supply may be detected.

Electronic controller 22 receives data 23 from a host system, such as a computer, and may include memory for temporarily storing data 23. Data 23 may be sent to inkjet printing system 10 along an electronic, infrared, optical or other information transfer path. Data 23 represent, for example, a document and/or file to be printed. As such, data 23 form a print job for inkjet printing system 10 and include one or more print job commands and/or command parameters.

In one example, electronic controller 22 provides control of printhead assembly 12 including timing control for ejection of ink drops from nozzles 13. As such, electronic controller 22 defines a pattern of ejected ink drops which form characters, symbols, and/or other graphics or images on print medium 19. Timing control and, therefore, the pattern of ejected ink drops, is determined by the print job commands and/or command parameters. In one example, logic and drive circuitry forming a portion of electronic controller 22 is located on printhead assembly 12. In another example, logic and drive circuitry forming a portion of electronic controller 22 is located off printhead assembly 12.

Figure 2:
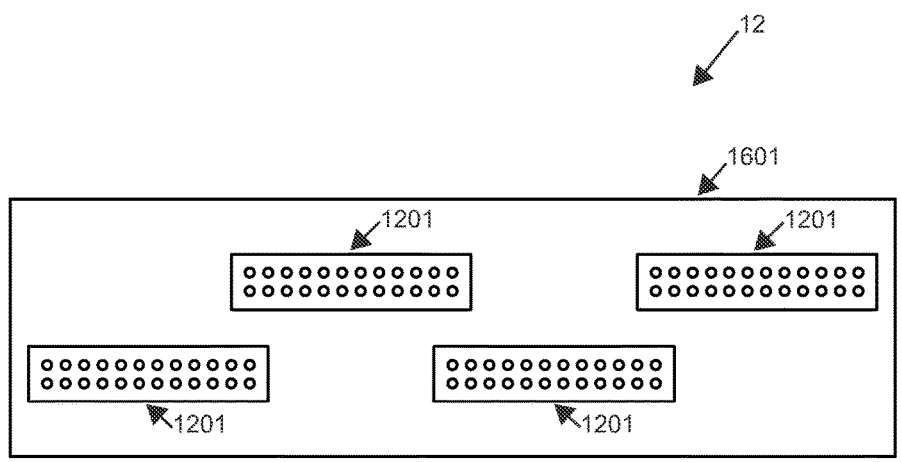
FIG. 2 is a schematic illustration of one example of a printhead assembly of a printing system.

In one example, as illustrated in FIG. 2, printhead assembly 12 is a wide-array or multi-head printhead assembly and includes a carrier 1601, as an example of carriage assembly 16, and a plurality of printhead dies 1201 mounted on carrier 1601. In one implementation, printhead dies 1201 are arranged and aligned in one or more overlapping rows (as oriented in FIG. 2) such that printhead dies 1201 in one row overlap at least one printhead die 1201 in another row. As such, printhead assembly 12 may span a nominal page width or a width shorter or longer than a nominal page width. For example, printhead assembly 12 may span 8.5 inches of a Letter size print medium or a distance greater than or less than 8.5 inches of the Letter size print medium. While four printhead dies 1201 are illustrated as being mounted on carrier 1601, the number of printhead dies 1201 mounted on carrier 1601 may vary.

In one implementation, printhead assembly 12, as a wide-array or multi-head printhead assembly including printhead dies 1201, is a non-scanning type printhead assembly such that carrier 1601 fixes printhead assembly 12 at a prescribed position relative to print media transport assembly 18 (FIG. 1). With a position of printhead assembly 12 fixed, print medium 19 (FIG. 1) is moved or advanced relative to printhead assembly 12 during printing.

Figure 3:
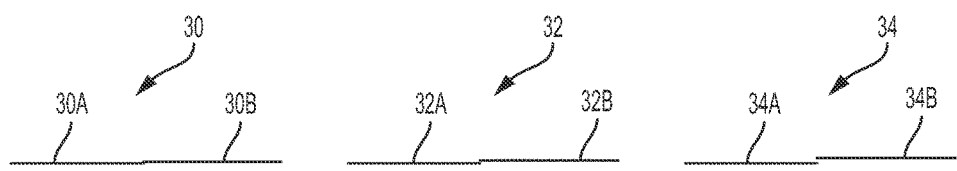
FIG. 3 is a schematic illustration of one example of printed outputs of a printing system.

FIG. 3 is a schematic illustration of one example of printed outputs 30, 32 and 34 of printing system 10. Printed outputs 30, 32, and 34 represent varying levels or deviations associated with a system state of printing system 10. The system state can be any of a variety of performance parameters of print elements of printing system 10, including but not limited to, for example, horizontal or vertical alignment of multiple printhead dies of printing system 10 or color calibration or uniformity of multiple printhead dies of printing system 10.

In one example, a diagnostic check of a system state of printing system 10 is periodically performed, and a diagnostic plot of the check is printed or displayed for evaluation. The diagnostic check may be initiated, for example, via an automated signal from electronic controller 22 or via a manual signal received by a user. The diagnostic plot is reviewed or evaluated to determine if the system state is, for example, within, at, or out of specification. In one example, a system state which is within predetermined tolerances or levels does not prompt corrective action for printing system 10. Such state, however, may be communicated to a user or operator of printing system 10. A system state which is at or outside of predetermined tolerances or levels, however, may be communicated to a user or operator of printing system 10 (for acknowledgement or further action), or may prompt corrective action for printing system 10, for example, alignment, calibration, or other adjustment, repair or service of printing system 10 related to the out-of-specification system state.

In one example, the system state being within, at, or out of specification is with reference to a certain threshold or thresholds. As examples, the system state being within, at, or out of specification may be with reference to a manufacturing specification, a 'normal operation' specification (as further defined, for example, within a manufacturing specification), or an arbitrary or custom specification (as defined, for example, for a specific application, such as, for example, high quality printing). Other thresholds, specifications, levels, limits, or values, however, may be used.

Printed outputs 30, 32, and 34 represent an example of three printouts of the system state of a horizontal line printed by two printhead dies 1201 (FIG. 2) of printing system 10. The left half of printed outputs 30, 32, and 34 are printed, for example, via a first of printhead dies 1201, and the right half of printed outputs 30, 32, and 34 are printed, for example, via a second of printhead dies 1201.

In this example, the specifications of printing system 10 indicate that a variation in die alignment less than two pixels at 1200 dpi represents no noticeable effects in line continuity, and thus, is acceptable and within specification or tolerance. A system state less than a two pixel variation at 1200 dpi, therefore, indicates no corrective action for printing system 10. A system state equal to or greater than a two pixel variation at 1200 dpi, however, may indicate corrective action for printing system 10, such as printhead alignment, color calibration, or other corrective action or troubleshooting.

As shown in FIG. 3, printed outputs 30, 32, and 34 represent a horizontal line having a one pixel variation, a two pixel variation, and a three pixel variation, respectively, between line portions 30*a*, 32*a*, and 34*a* printed by a first of printhead dies 1201 and line portions 30*b*, 32*b*, and 34*b* printed by a second of printhead dies 1201. Thus, in the illustrated example, printed output 30 is a system state which is within predetermined tolerances or levels, and printed outputs 32 and 34 are system states which are at or outside of the predetermined tolerances or levels.

Figure 4:
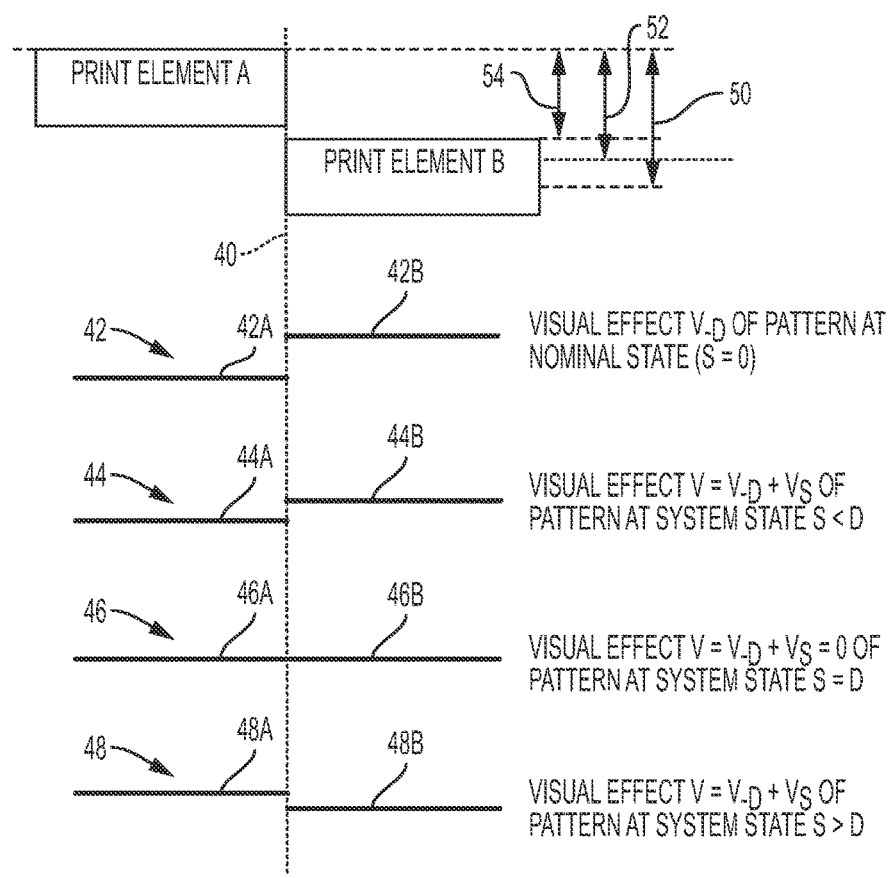
FIG. 4 is a schematic illustration of examples of diagnostic plots generated by a printing system.

FIG. 4 is a schematic illustration of one example of print elements A and B of printing system 10 and a junction 40 between print elements A and B, as represented by a vertical dashed line. It is understood that while print elements A and B are shown immediately adjacent or abutting the vertical dashed line of junction 40, these print elements can be positioned overlapping each other. In this example, print elements A and B represent two separate, overlapping and adjacent printhead dies 1201 of printhead assembly 12 (FIG. 2).

FIG. 4 also illustrates examples of diagnostic plots 42, 44, 46, and 48 associated with print elements A and B. As shown in FIG. 4, the left half of diagnostic plots 42, 44, 46, and 48 (illustrated to the left of junction 40) are printed via print element A, and the right half of diagnostic plots 42, 44, 46, and 48 (illustrated to the right of junction 40) are printed via print element B.

Distance 54 represents the nominal distance Sn between print element A and print element B as measured, for example, between respective common reference points of print elements A and B. In one example, distance 54 is measured between respective nozzles of adjacent printhead dies 1201 (FIG. 2). As such, distance 54 represents a nominal distance between the horizontal centerlines of print elements A and B.

As shown in FIG. 4, distance 50 represents the maximum positive distance D (plus D) (relative to the nominal distance) that print elements A and B may be spaced that still produces an output with no visible line continuity problems, and thus defines an alignment specification or tolerance of printing system 10. In one example, as illustrated and described above with reference to printed outputs 30, 32, and 34 of FIG. 3, an example of a predetermined specification or tolerance is two pixels, such that the maximum positive distance is the nominal distance plus two pixels (D=Sn+2 pixels).

Distance 52 represents the system state distance S between print elements A and B, and corresponds to the actual distance between print elements A and B. In the current example, if system state distance S/52 is less than maximum distance D/50 (S<D), then the system state being tested is within system specifications or tolerances. Conversely, if system state distance S/52 is equal to or greater than maximum distance D/50 (S=D, S>D), then the system state being tested is outside of system specifications or tolerances.

As also shown in FIG. 4, diagnostic plots 42-48 illustrate examples of system states associated with print elements A and B where printing system 10 is commanded to print an image with a step of height D at the junction of print elements A and B. Diagnostic plot 42 is illustrated having a step up pattern in that horizontal line 42B to the right of junction 40 is above horizontal line 42A to the left of junction 40. This pattern of diagnostic plot 42 represents that the system state being evaluated is within specification or tolerance. More specifically, the pattern of diagnostic plot 42 represents the print output of the distance between the horizontal centerlines of print elements A and B where print elements A and B are vertically aligned with each other by the nominal amount such that system state distance S/52 equals zero (S=0) (perfect or nominal alignment), and thus, is less than maximum distance D/50.

Diagnostic plot 44 is also illustrated having a step up pattern in that horizontal line 44B to the right of junction 40 is above horizontal line 44A to the left of junction 40. This pattern of diagnostic plot 44 represents that the system state being evaluated is also within specification or tolerance. More specifically, the pattern of diagnostic plot 44 represents the print output of the distance between the horizontal centerlines of print elements A and B where the system state distance S/52 is less than maximum distance D/50; S=D, when the print input includes the step height D.

Diagnostic plot 46 is illustrated having a continuous line pattern in that horizontal lines 46A and 46B to the left and right of junction 40 are on the same horizontal plane. This pattern of diagnostic plot 46 represents that the system state being evaluated is not within specification or tolerance. More specifically, the pattern of diagnostic plot 46 represents the print output of the distance between the horizontal centerlines of print elements A and B where the system state distance S/52 is equal to the maximum distance D/50; S=D, when the print input includes the step height D.

Diagnostic plot 48 is illustrated having a step down pattern in that horizontal line 48B to the right of junction 40 is below horizontal line 48A to the left of junction 40. This pattern of diagnostic plot 48 represents that the system state being evaluated is not within specification or tolerance. More specifically, the pattern of diagnostic plot 48 represents the print output of the distance between the horizontal centerlines of print elements A and B where the system state distance S/52 is greater than the maximum distance D/50; S>D.

In one example, diagnostic plots 42-48 provide a visual pattern which simplifies identification of system states that are within predetermined specifications and system states that are at or out of predetermined specifications. More specifically, in the example, diagnostic plots 42-44 illustrate a visual step up pattern indicating that a system state is within specifications or tolerances. Conversely, diagnostic plots 46-48 illustrate a lack of a visual step up pattern, such as a straight line or a visual step down pattern, indicating that a system state is out of specifications or tolerances.

Figure 5:
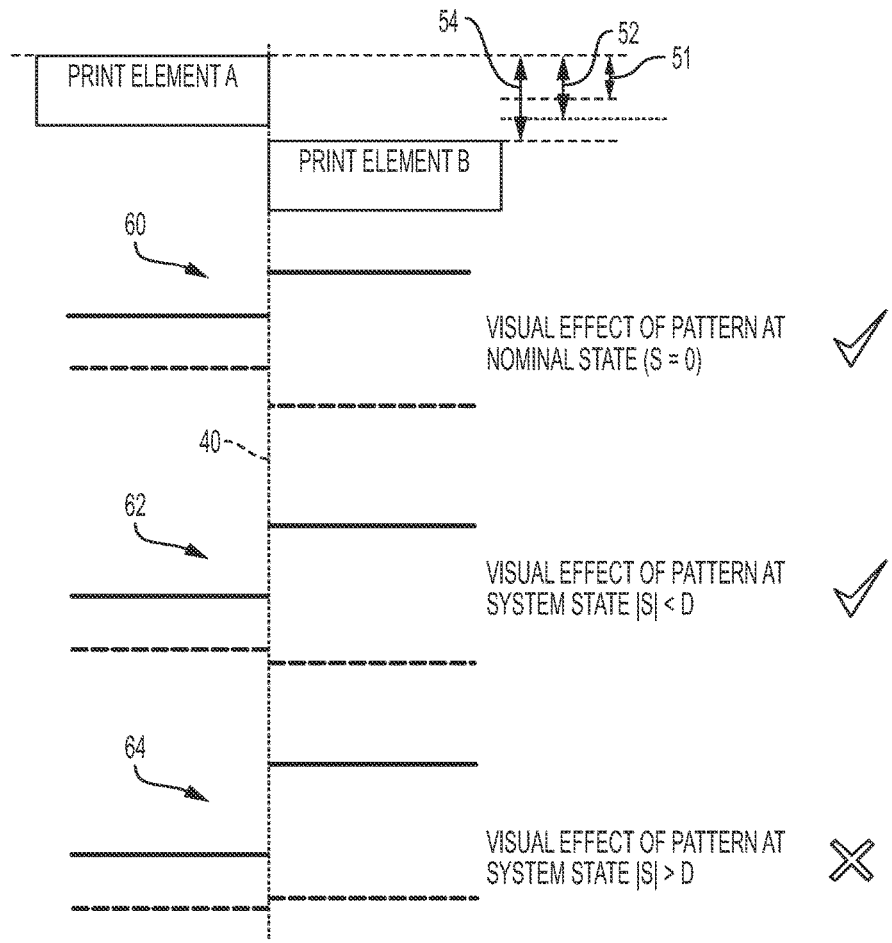
FIG. 5 is a schematic illustration of additional examples of diagnostic plots generated by a printing system.

FIG. 5 is a schematic illustration of additional examples of diagnostic plots generated by printing system 10. Diagnostic plots 60, 62, and 64 are shown in FIG. 5 and each plot includes two patterns that comprise an upper and a lower specification boundary. The upper specification boundary, shown in solid lines, of each state is similar to that shown and disclosed with reference to FIG. 4. The lower specification boundary, shown in dashed lines, of each state represents a pattern complementary to the associated upper specification boundary and illustrates an opposite sign (negative vs. positive) of the specification or tolerance where printing system 10 is commanded to print an image with a down step of height D at the junction of print elements A and B. It is understood that representation of the upper and lower specification boundaries in solid and dashed lines is merely for illustration purposes and is not part of the plot or pattern, or meant to be limiting in any way, and other representation of the upper and lower specification boundaries may be used, such as, for example, different line colors, different line weights, or other different line types.

As shown in FIG. 5, the left half of diagnostic plots 60, 62, and 64, (illustrated to the left of junction 40) are printed via print element A, and the right half of diagnostic plots 60, 62, and 64 (illustrated to the right of junction 40) are printed via print element B. Diagnostic plots 60-64 illustrate examples of system states associated with print elements A and B where printing system 10 is commanded to print an image with a step of height D at the junction of print elements A and B as a top half of each diagnostic plot, and a down step of height D at the junction of print elements A and B as the bottom half of each diagnostic plot.

As shown in FIG. 5, distance 51 represents the maximum negative distance −D (minus D) (relative to the nominal distance) that print elements A and B may be spaced that still produces an output with no visible line continuity problems, and thus defines an alignment specification or tolerance of printing system 10. In one example, where the predetermined specification or tolerance is two pixels, the maximum negative distance is the nominal distance minus two pixels (D=Sn−2 pixels).

Diagnostic plot 60 includes a visual effect pattern illustrating both the upper and lower specification boundaries, as well as the system state (distance between horizontal centerlines of print elements A and B), in an example where the system state distance S/52 between the horizontal centerlines of print elements A and B is equal to the nominal; S=0, similar to diagnostic plot 42 (FIG. 4). In this illustration, both a visual step up pattern for the upper specification boundary and a visual step down pattern for the lower specification boundary indicate that the system state (distance between horizontal centerlines of print elements A and B) is within predetermined specifications or tolerances, as indicated by a check mark.

Diagnostic plot 62 includes a visual effect pattern illustrating both the upper and lower specification boundaries, as well as the system state (distance between horizontal centerlines of print elements A and B), in an example where the absolute value of the actual distance S/52 between the horizontal centerlines of print elements A and B is less than the maximum distance D/50; |S|<D. In this illustration, both a visual step up pattern for the upper specification boundary and a visual step down pattern for the lower specification boundary indicate that the system state (distance between horizontal centerlines of print elements A and B) is within predetermined specifications or tolerances, as indicated by a check mark.

Diagnostic plot 64 includes a visual effect pattern illustrating both the upper and lower specification boundaries, as well as the system state (distance between horizontal centerlines of print elements A and B), in an example where the absolute value of the actual distance S/52 between the horizontal centerlines of print elements A and B is greater than the maximum distance D/50; |S|>D. While a visual step up pattern for the upper specification boundary is shown, the lack of a visual step down pattern for the lower specification boundary indicates a deviation or variation in the pattern and indicates that a system state is out of specifications or tolerances. Similarly, although not shown, in this example, the lack of a visual step up pattern for the upper specification boundary in association with a visual step down pattern for the lower specification boundary indicates that a system state is out of specifications or tolerances, as indicated by an "X".

Figure 6:
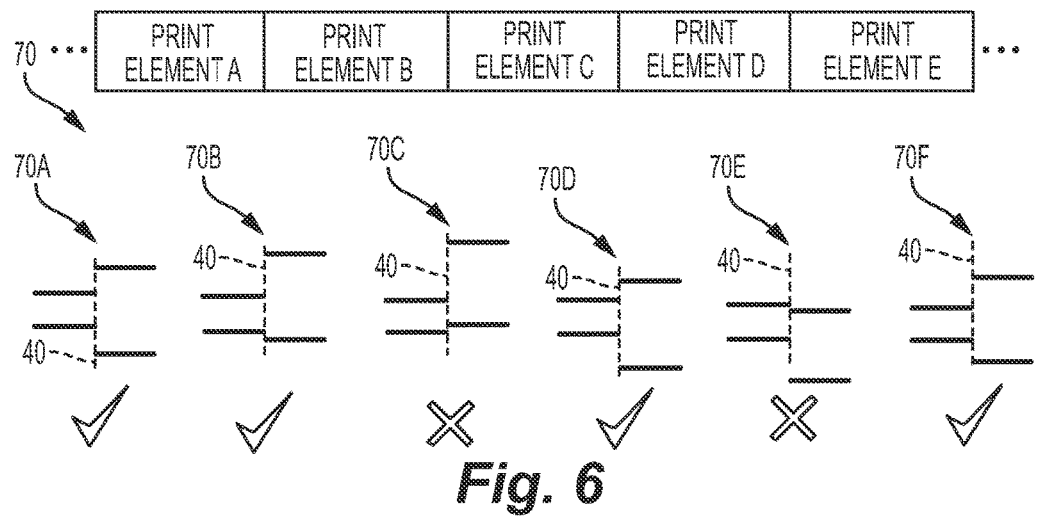
FIG. 6 is a schematic illustration of one example of a diagnostic plot including a series of diagnostic patterns generated by a printing system.

FIG. 6 is a schematic illustration of one example of a diagnostic plot 70 including a series of diagnostic patterns 70A, 70B, 70C, 70D, 70E, and 70F generated by printing system 10. Diagnostic plot 70 may, for example, illustrate a plurality of system state diagnostics. Diagnostic plot 70, therefore, provides a diagnostic tool to determine if one or more system states are within predetermined and/or stated specifications.

As shown in FIG. 6, one half of each diagnostic pattern 70A, 70B, 70C, 70D, 70E, and 70F (illustrated to the left of junction 40) is printed via a first print element or printhead die, and the other half of each diagnostic pattern 70A, 70B, 70C, 70D, 70E, and 70F (illustrated to the right of junction 40) is printed via a second print element or printhead die. For example, the left half of diagnostic pattern 70B is printed by print element A and the right half of diagnostic pattern 70B is printed by print element B.

As shown in FIG. 6, diagnostic patterns 70A, 70B, 70D, and 70F illustrate both a step up pattern and a step down pattern, namely a step up pattern above a step down pattern. The consistency of these patterns relative to each other represent a system state that is within specification, as indicated by a check mark. Conversely, diagnostic pattern 70C illustrates two step up patterns, namely a step up pattern above a step up pattern, and diagnostic pattern 70E illustrates two step down patterns, namely a step down pattern above a step down pattern. The inconsistency or variation of these patterns relative to the adjacent patterns represent system states that are out of specification, as indicated by an "X". For example, the inconsistency or variation of diagnostic pattern 70C relative to diagnostic patterns 70B and 70D indicates that alignment between print elements B and C is out of specification While the illustration in FIG. 6 includes a check mark or "X" below each of the diagnostic patterns 70A, 70B, 70C, 70D, 70E, and 70F, the check marks and "X"s are shown for informational and illustrative purposes only. It is understood that these indicators may not be part of diagnostic printout or display.

Figure 7:
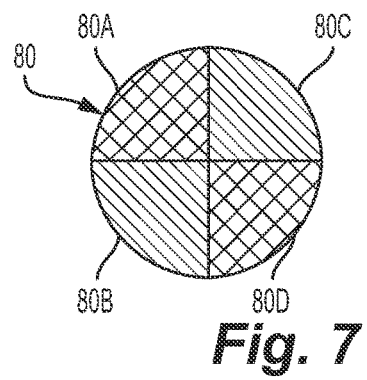
FIG. 7 is a schematic illustration of one example of a diagnostic plot generated by a printing system.

FIG. 7 is a schematic illustration of an example of a diagnostic plot 80 generated by printing system 10. In one example, diagnostic plot 80 provides a visual diagnostic pattern which simplifies identification of color uniformity of printing system 10 being within predetermined specifications and color uniformity of printing system 10 being at or out of predetermined specifications. In one example, diagnostic plot 80 is a circle including quadrants 80A, 80B, 80C, and 80D. However, it is understood that other shapes, patterns, or configurations may be utilized.

In one example, the left half of the visual diagnostic pattern of diagnostic plot 80, which includes quadrants 80A and 80B, is printed via a first print element or printhead die, and the right half of the visual diagnostic pattern of diagnostic plot 80, which includes quadrants 80C and 80D, is printed via a second print element or printhead die. Further, the upper half and the lower half of one half of the visual diagnostic pattern, for example, quadrants 80A and 80B, represent different color threshold values of the respective print element or printhead die, and the upper half and the lower half of the other half of the visual diagnostic pattern, for example, quadrants 80C and 80D, represent opposite threshold values of the respective print element or printhead die. In one example, the input image to printing system 10 has the same color value (e.g., a first lightness value) for quadrants 80C and 80B, and the same color value (e.g., a second lightness value) for quadrants 80A and 80D, where the color difference between quadrants 80A and 80C (and quadrants 80B 80D) is the maximum value that produces a non-noticeable difference, and thus defines a threshold color difference.

The visual diagnostic pattern of diagnostic plot 80 provides an easily detectable and understandable pattern. In one example, a diagnostic pattern illustrating similar sub patterns within first upper quadrant 80A and second lower quadrant 80D, as well as similar sub patterns within first lower quadrant 80B and second upper quadrant 80C, indicates that the system state is within predetermined specifications or tolerances. Conversely, a diagnostic pattern illustrating differing sub patterns within either first upper quadrant 80A and second lower quadrant 80D or first lower quadrant 80B and second upper quadrant 80C indicates that the system state is out of predetermined specifications or tolerances.

While quadrants 80A, 80B, 80C, and 80D are shown having specific hatch patterns, these specific hatch patterns are for illustrative purposes only. It is understood that any distinctive pattern(s) may be utilized.

Figure 8:
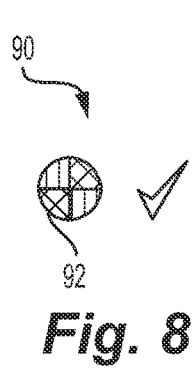
FIG. 8 is a schematic illustration of one example of a pattern detection guideline.

FIG. 8 is a schematic illustration of one example of a diagnostic pattern detection guideline 90, including one example of a favorable diagnostic pattern 92 and a check mark. Favorable diagnostic pattern 92 includes a pattern having similar sub patterns within the first upper quadrant and the second lower quadrant, as well as similar sub patterns within the first lower quadrant and the second upper quadrant. The similar sub patterns indicate that the system state is within predetermined specifications or tolerances. In one example, the system state is identification of a color uniformity of printing system 10.

While the illustration in FIG. 8 includes a check mark adjacent the favorable diagnostic pattern 92, this check mark is shown for informational and illustrative purposes only. It is understood that this check mark may or may not be part of diagnostic printout or display. Once again, while the quadrants are shown having specific hatch patterns, these specific hatch patterns are for illustrative purposes only. It is understood that any distinctive pattern(s) may be utilized.

Figure 9:
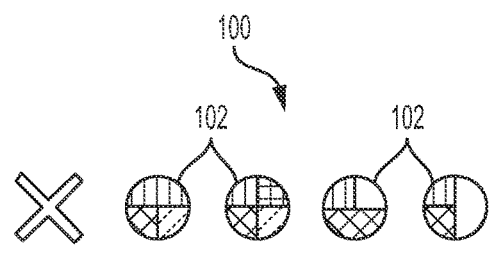
FIG. 9 is a schematic illustration of another example of pattern detection guidelines.

FIG. 9 is a schematic illustration of one example of a diagnostic pattern detection guideline 100, including examples of unfavorable diagnostic patterns 102 and an "X". As shown in FIG. 9, each unfavorable diagnostic pattern 102 includes a pattern having differing sub patterns within either the first upper quadrant and the second lower quadrant or the first lower quadrant and the second upper quadrant. The differing sub patterns (or lack of similar sub patterns) indicate that the system state is out of predetermined specifications or tolerances. In one example, the system state is identification of a color uniformity of printing system 10.

While the illustration in FIG. 9 includes an "X" adjacent the unfavorable diagnostic patterns 102, this "X" is shown for informational and illustrative purposes only. It is understood that this "X" may or may not be part of diagnostic printout or display. Once again, while the quadrants are shown having specific hatch patterns, these specific hatch patterns are for illustrative purposes only. It is understood that any distinctive pattern(s) may be utilized.

Figure 10:
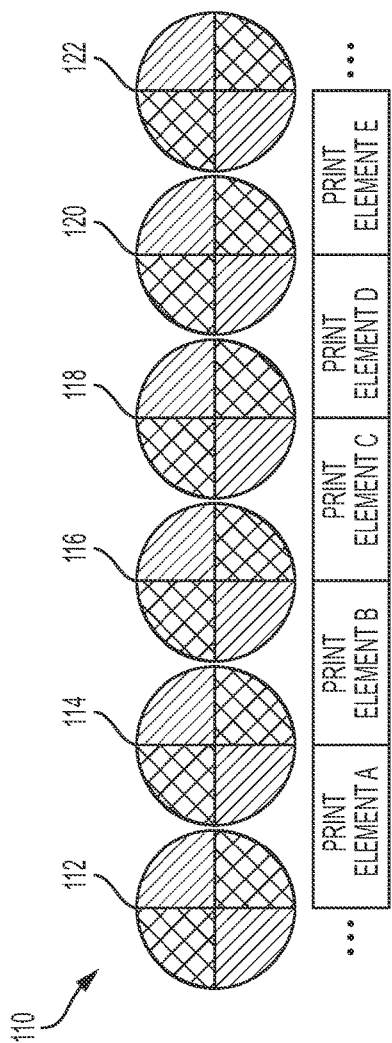
FIG. 10 is a schematic illustration of one example of a diagnostic plot including a series of diagnostic patterns generated by a printing system.

FIG. 10 is a schematic illustration of one example of a diagnostic plot 110 generated by printing system 10. In one example, diagnostic plot 110 includes a series of diagnostic patterns 112, 114, 116, 118, 120, and 122 printed partially or wholly by print elements A-E, with each diagnostic pattern 112-122 including a circle divided into four quadrants. In one example, one half of each diagnostic pattern 112-122 is printed via a first print element or printhead die, and the other half of each diagnostic pattern is printed via a second print element or printhead die. For example, the left half of diagnostic pattern 114 is printed by print element A and the right half of diagnostic pattern 114 is printed by adjacent print element B.

As shown in FIG. 10, each of the diagnostic patterns 112-122 include similar sub patterns that do not vary from the predetermined or repeating pattern of the adjacent print elements, with the upper left and lower right quadrants having the same pattern, and the lower right and upper left quadrants having the same pattern. Thus, the diagnostic plot 110 provides a discernible visual pattern which identifies that the system state being tested, color calibration or uniformity amongst or between adjacent print elements, is within predetermined specifications.

While a specific number of diagnostic plots and patterns, as well as print elements, are shown in FIG. 10, this is done for illustrative purposes only, as there is no restriction as to the number of print elements, diagnostic plots, or patterns.

Figure 11:
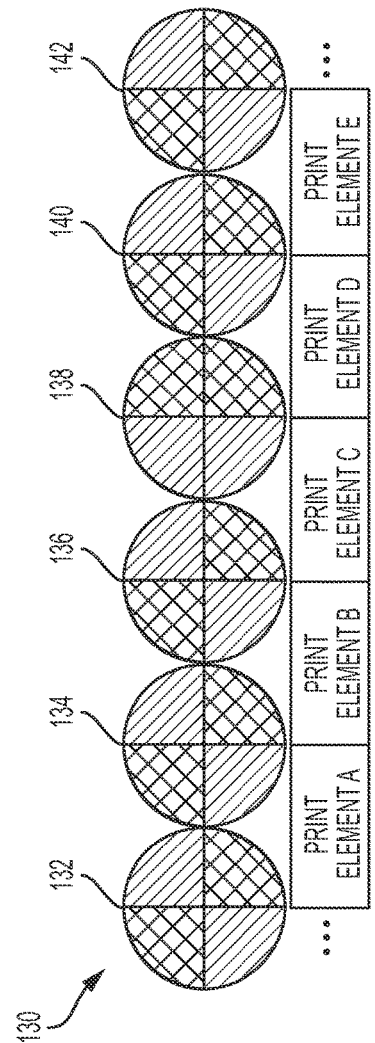
FIG. 11 is a schematic illustration of another example of a diagnostic plot including a series of diagnostic patterns generated by a printing system.

FIG. 11 is a schematic illustration of another example of a diagnostic plot 130 generated by printing system 10. In one example, diagnostic plot 130 includes a series of diagnostic patterns 132, 134, 136, 138, 140, and 142 printed partially or wholly by print elements A-E, with each diagnostic pattern 132-142 including a circle divided into four quadrants. As shown in FIG. 11, diagnostic patterns 132, 134, 136, 140, and 142 include sub patterns that do not vary from the predetermined or repeating pattern of the adjacent print elements, with the upper left and lower right quadrants having the same pattern, and the lower right and upper left quadrants having the same pattern. Thus, diagnostic patterns 132, 134, 136, 140, and 142 provide a discernible visual pattern which identifies that the system state being tested, color calibration or uniformity amongst or between adjacent print elements, is within predetermined specifications.

In one example, diagnostic pattern 138 includes sub patterns that vary from the predetermined or repeating pattern of the adjacent print elements, with the upper left and upper right quadrants varying from the predetermined or repeating pattern of, for example, diagnostic patterns 132, 134, 136, 140, and 142. Thus, diagnostic pattern 138 provides a discernible visual pattern which identifies that the system state being tested, color calibration or uniformity amongst or between adjacent print elements, is not within predetermined specifications.

Once again, while a specific number of diagnostic plots and patterns, as well as print elements, are shown in FIG. 11, this is done for illustrative purposes only, as there is no restriction as to the number of print elements, diagnostic plots, or patterns.

Figure 12:
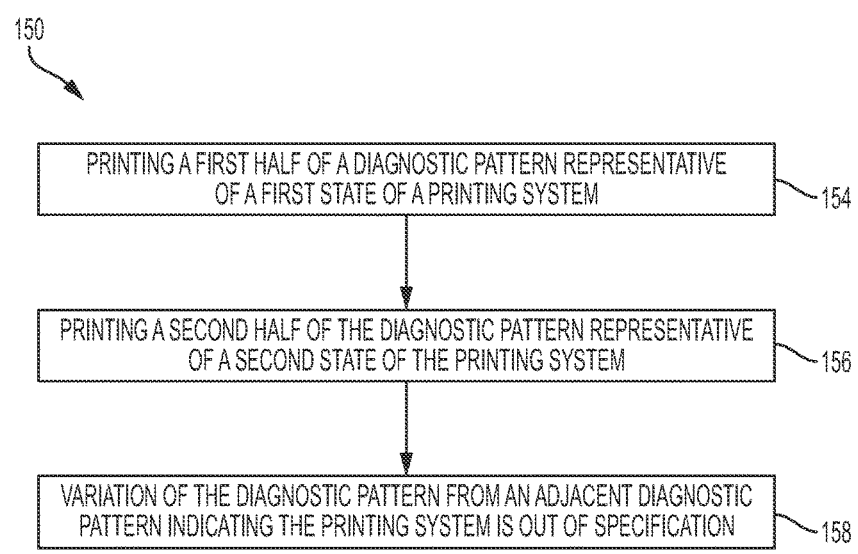
FIG. 12 is a flow diagram illustrating one example of a method of generating a diagnostic plot for a printing system.

FIG. 12 is a flow diagram 150 illustrating one example of a method of generating a diagnostic plot for a printing system. At 154, a first half of a diagnostic pattern representative of a first state of the printing system is printed. As an example, 154 includes printing the left half of diagnostic pattern 70B by print element A, as illustrated and described with reference to FIG. 6. As another example, 154 includes printing the left half of diagnostic pattern 134 by print element A, as illustrated and described with reference to FIG. 11. At 156, a second half of the diagnostic pattern representative of a second state of the printing system is printed. As an example, 156 includes printing the right half of diagnostic pattern 70B by print element B, as illustrated and described with reference to FIG. 6. As another example, 156 includes printing the right half of diagnostic pattern 134 by print element B, as illustrated and described with reference to FIG. 11. At 158, variation of the diagnostic pattern from an adjacent diagnostic pattern indicates the printing system is out of specification. As an example, 158 includes variation of diagnostic pattern 70C relative to diagnostic patterns 70B and 70D, as illustrated and described with reference to FIG. 6. As another example, 158 includes variation of diagnostic pattern 138 relative to diagnostic patterns 132, 134, 136, 140, and 142, as illustrated and described with reference to FIG. 11.

The diagnostic plots and patterns disclosed herein may represent any of a variety of system states or functions, including but not limited to print element or printhead die position tolerances, print line continuity (horizontal, vertical, or otherwise), color uniformity or calibration, and print element or printhead die alignment. The diagnostic plots and patterns disclosed herein, therefore, provide diagnostic tools to determine that an evaluated system state is within predetermined and/or stated specifications.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A method of generating a diagnostic plot for a printing system, comprising:
    printing a first half of a diagnostic pattern representative of a first state of the printing system;
    printing a second half of the diagnostic pattern representative of a second state of the printing system;
    wherein variation of the diagnostic pattern from an adjacent diagnostic pattern indicates the printing system is out of specification, and
    wherein the diagnostic pattern includes adjacent horizontal lines, and the variation of the diagnostic pattern comprises a change in pattern of alignment of the horizontal lines including one of a change from a step up pattern of the horizontal lines to a step down pattern of the horizontal lines and a change from a step down pattern of the horizontal lines to a step up pattern of the horizontal lines.

2. The method of claim 1, wherein:
    printing the first half of the diagnostic pattern comprises printing a first half of an alignment calibration pattern; and printing the second half of the diagnostic pattern comprises printing a second half of the alignment calibration pattern.

3. The method of claim 2, further comprising:
printing the first half of the alignment calibration pattern from a first print element; and
printing the second half of the alignment calibration pattern from a second print element adjacent the first print element.

4. The method of claim 1, further comprising:
printing the first half of the diagnostic pattern from a first print element; and
printing the second half of the diagnostic pattern from a second print element adjacent the first print element.

5. A method of generating a diagnostic plot for a printing system, comprising:
printing a first half of a diagnostic pattern representative of a first state of the printing system;
printing a second half of the diagnostic pattern representative of a second state of the printing system;
wherein variation of the diagnostic pattern from an adjacent diagnostic pattern indicates the printing system is out of specification, and
wherein the diagnostic pattern includes a circle divided into four quadrants, and the variation of the diagnostic pattern comprises a change in pattern of the quadrants of the circle.

6. The method of claim 5, further comprising:
printing the first half of the diagnostic pattern from a first print element; and
printing the second half of the diagnostic pattern from a second print element adjacent the first print element.

7. The method of claim 5, wherein:
printing the first half of the diagnostic pattern comprises printing a first half of a color calibration pattern; and
printing the second half of the diagnostic pattern comprises printing a second half of the color calibration pattern.

8. The method of claim 7, further comprising:
printing the first half of the color calibration pattern from a first print element; and
printing the second half of the color calibration pattern from a second print element adjacent the first print element.

9. A method of generating a diagnostic plot for a printing system, comprising:
printing, with a first print element, a first half of a diagnostic pattern representative of a state of the first print element;
printing, with a second print element adjacent the first print element, a second half of a diagnostic pattern representative of a state of the second print element;
wherein variation of the diagnostic pattern from an adjacent diagnostic pattern indicates the printing system is out of specification, and wherein:
printing the first half of the diagnostic pattern comprises printing a first half of a color calibration pattern; and
printing the second half of the diagnostic pattern comprises printing a second half of the color calibration pattern,
the color calibration pattern including a circle divided into four quadrants, and the variation of the diagnostic pattern comprising a change in pattern of the quadrants of the circle.

10. A method of generating a diagnostic plot for a printing system, comprising:
printing, with a first print element, a first half of a diagnostic pattern representative of a state of the first print element;
printing, with a second print element adjacent the first print element, a second half of a diagnostic pattern representative of a state of the second print element;
wherein variation of the diagnostic pattern from an adjacent diagnostic pattern indicates the printing system is out of specification, and wherein:
printing the first half of the diagnostic pattern comprises printing a first half of an alignment calibration pattern; and
printing the second half of the diagnostic pattern comprises printing a second half of the alignment calibration pattern,
the alignment calibration pattern including adjacent horizontal lines, and the variation of the diagnostic pattern comprising a change in pattern of alignment of the horizontal lines including one of a change from a step up pattern of the horizontal lines to a step down pattern of the horizontal lines and a change from a step down pattern of the horizontal lines to a step up pattern of the horizontal lines.

11. A printing system, comprising:
a first print element to print a first half of a diagnostic pattern representative of a first state of the printing system;
a second print element to print a second half of the diagnostic pattern representative of a second state of the printing system; and
wherein variation of the diagnostic pattern from an adjacent diagnostic pattern indicates the printing system is out of specification,
wherein the diagnostic pattern includes a circle divided into four quadrants, and the variation of the diagnostic pattern comprises a change in pattern of the quadrants of the circle.

12. The printing system of claim 11, wherein the diagnostic pattern comprises a color calibration pattern.

13. A printing system, comprising:
a first print element to print a first half of a diagnostic pattern representative of a first state of the printing system;
a second print element to print a second half of the diagnostic pattern representative of a second state of the printing system; and
wherein variation of the diagnostic pattern from an adjacent diagnostic pattern indicates the printing system is out of specification,
wherein the diagnostic pattern includes adjacent horizontal lines, and the variation of the diagnostic pattern comprises a change in pattern of alignment of the horizontal lines including one of a change from a step up pattern of the horizontal lines to a step down pattern of the horizontal lines and a change from a step down pattern of the horizontal lines to a step up pattern of the horizontal lines.

14. The printing system of claim 13, wherein the diagnostic pattern comprises an alignment calibration pattern.

* * * * *